J. O. OLSON.
BLOW TORCH.
APPLICATION FILED MAY 28, 1917.
1,261,277.
Patented Apr. 2, 1918.
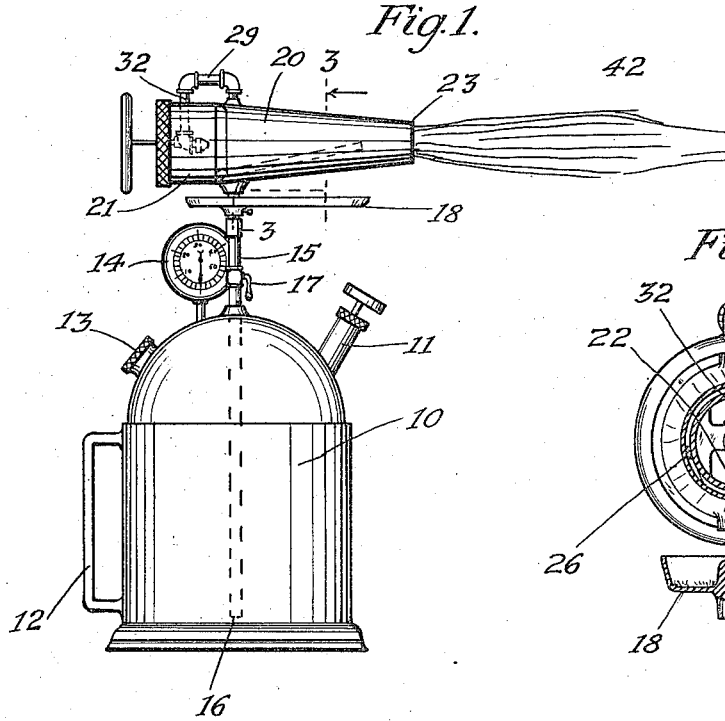
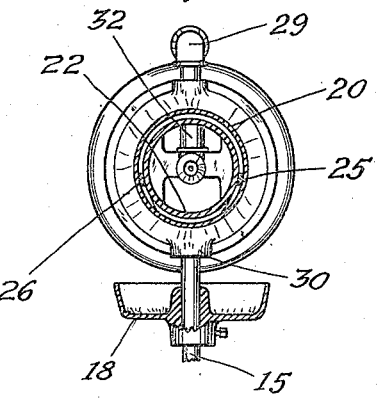
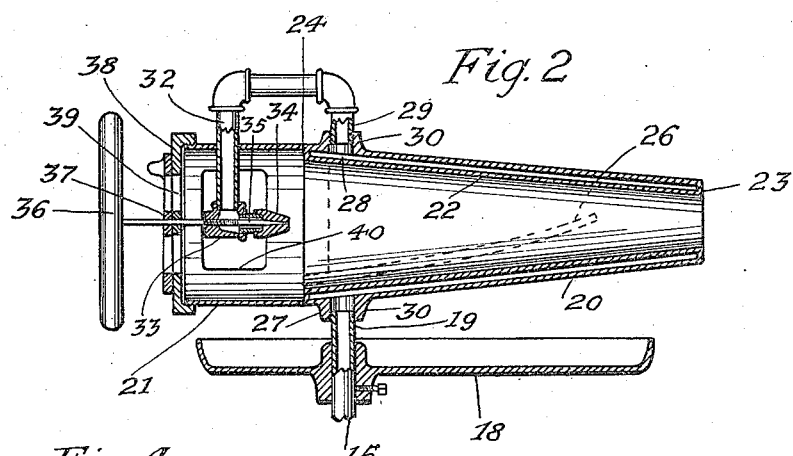
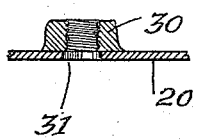
Inventor:
John O. Olson
By A. Whiteley
his Attorney

UNITED STATES PATENT OFFICE.

JOHN O. OLSON, OF ST. PAUL, MINNESOTA, ASSIGNOR OF ONE-HALF TO JAMES MARZLOF, OF ST. PAUL, MINNESOTA.

BLOW-TORCH.

1,261,277.  Specification of Letters Patent.  Patented Apr. 2, 1918.

Application filed May 28, 1917. Serial No. 171,408.

*To all whom it may concern:*

Be it known that I, JOHN O. OLSON, a citizen of the United States, residing at St. Paul, in the county of Ramsey and State of Minnesota, have invented certain new and useful Improvements in Blow-Torches, of which the following is a specification.

My invention relates to blow torches and has for its object to provide an improved and highly efficient torch adapted to burn kerosene or other low-test fuel oil, and which will be in a high degree effective in producing complete and safe volatilization of said fuel oil.

The full objects and advantages of my invention will appear in connection with the detailed description thereof and are particularly pointed out in the claims.

In the drawings, illustrating the application of my invention in one form,—

Figure 1 is a side elevation view showing a complete blow torch outfit embodying my improvements. Fig. 2 is a longitudinal section through the blow torch. Fig. 3 is an enlarged sectional view on line 3—3 of Fig. 1. Fig. 4 is an enlarged sectional detail.

As illustrated, my invention is connected with the usual tank or receptacle 10 provided with a pump 11 having handle 12, inlet 13, gage 14 and feed-pipe 15, which extends to a point close to the bottom of tank 10 as indicated in dotted lines at 16, and which is adapted to be closed by a cock 17.

Upon the pipe 15 is secured a generator trough 18 and above this trough, and preferably extending parallel therewith and supported upon the end of pipe 15 as indicated at 19, is an outer shell 20 preferably formed in the frustum of a cone and having associated with its larger end a cylindrical shell 21. An inner shell 22 is held parallel and spaced from the shell 20 by end partitions 23 and 24 which seal the annular space between the shells at its ends. The shells are additionally supported by longitudinal strips 25 and 26, indicated in dotted lines in Fig. 2, which extend to a point near the small end 23 of the double hollow cone-frustum formed by the concentrically spaced and interconnected shells 20 and 22. These strips or bars not only furnish a supporting mechanism for rigidly holding the two shells in spaced relation, but so divide that space that fuel oil entering the same at 27 near the large end must move around past the ends of the strips 25 and 26 before it can pass into the upper space and leave the space between the shells at 28, where it enters the gas-delivery pipe 29. The pipe 29, like pipe 15, is threaded into a nut 30, which, as shown in Fig. 4, is brazed to the shell 20 over an aperture 31 therein. A connected portion 32 of pipe 29 extends through the cylindrical casing 21 and is connected with a valve-head 33 at the center of the cylinder 21, said valve-head communicating with a valve point 34 which is controlled by a valve 35 operated by a hand wheel 36. The valve stem 35 is threaded into the valve-head 33 and is supported at 37 by a bearing in a face nut 38 threaded upon cylindrical portion 21, said face nut being provided with apertures 39 for the admission of air into the casing 21 which also may have one or more apertures 40 for the same purpose.

The advantages of my invention will be apparent. The fuel oil under the pressure from the pump will, when cock 17 is opened, pass within the space between the two shells and flow to the front of said space adjacent end 23 and on one side of partitions 25 and 26 and back through said space on the other side o fthe partitions to the gas delivery pipe 29. The combustion flame will be formed within the chamber provided inside of the inner shell 22, the blast flame issuing from the end 23 as indicated at 42. The inner wall of inner shell 22 is thus subjected to a very large extent of the flame and quickly becomes greatly heated. The oil flowing up through pipe 19 being subjected to this heat for an extended period of time as the oil travels first to the front end of the space between the casings and then back to the rear end, will become perfectly volatilized under relatively high pressure. This gas issuing from the valve point 34 in the combustion chamber, and in association with a ready flow of air from the large area of aperture indicated by 39 and 40, forms an intensely hot flame in which complete combustion takes place. Not only is the oil completely turned to gas, but the gas issues under both great heat and pressure which increases its combustibility and also the heat efficiency of the flame.

I claim:

1. A blow torch comprising an elongated combustion chamber having a portion thereof formed of a pair of concentric shells having the shape of a cone frustum with the small end turned outwardly, and spaced apart to form an annular chamber between the shells sealed at the ends of the shells, with partition walls extending along the sides from the seal of the large end to a point near the small end so as to divide the chamber between the shells into two portions communicating only at the small end thereof, and means for admitting fuel oil and withdrawing gas from the respective portions at points near the large ends thereof whereby the oil is caused to move in a thin and extended sheet subject to the heat of the flame.

2. A blow torch comprising an elongated combustion chamber having a cylindrical portion, and an attached portion in the form of a frustum of a cone with the small end turned outwardly, said frustum comprising a pair of concentric shells spaced apart to form an annular chamber sealed at the ends of the shells, with partition walls extending along the sides from the seal point of the large end to a point near the small end so as to divide the space of the chamber between the shells into two portions communicating only at the small end thereof, and means for admitting fuel oil into one of said portions adjacent the large end, and means for withdrawing gas from the other of said portions adjacent the large end and for introducing the gas to a burner at the center of the cylindrical portion of the combustion chamber.

In testimony whereof I affix my signature.

JOHN O. OLSON.

Copies of this patent may be obtained for five cents each, by addressing the "Commissioner of Patents, Washington, D. C."